United States Patent [19]

Pierik

[11] Patent Number: 5,680,836

[45] Date of Patent: Oct. 28, 1997

[54] PLANETARY CAM PHASER WITH LASH COMPENSATION

[75] Inventor: Ronald Jay Pierik, Rochester, N.Y.

[73] Assignee: General Motors Corporation, Detroit, Mich.

[21] Appl. No.: 715,147

[22] Filed: Sep. 17, 1996

[51] Int. Cl.⁶ .................................................. F01L 1/344
[52] U.S. Cl. .................... 123/90.17; 123/90.31; 74/568 R; 464/2
[58] Field of Search ................ 123/90.15, 90.17, 123/90.31; 74/568 R; 464/1, 2, 160

[56] References Cited

U.S. PATENT DOCUMENTS

| | | | |
|---|---|---|---|
| 4,976,229 | 12/1990 | Charles | 123/90.31 |
| 5,156,119 | 10/1992 | Suga | 123/90.31 |
| 5,174,253 | 12/1992 | Yamazaki et al. | 123/90.31 |
| 5,203,291 | 4/1993 | Suga et al. | 123/90.31 |
| 5,327,859 | 7/1994 | Pierik et al. | 123/90.17 |
| 5,355,849 | 10/1994 | Schiattino | 123/90.17 |
| 5,361,736 | 11/1994 | Phoenix et al. | 123/90.17 |
| 5,365,898 | 11/1994 | Mueller | 123/90.17 |
| 5,542,383 | 8/1996 | Clarke et al. | 123/90.17 |

*Primary Examiner*—Weilyn Lo
*Attorney, Agent, or Firm*—Karl F. Barr, Jr.

[57] ABSTRACT

A planetary cam phaser for varying the timing of an engine camshaft is provided with oppositely tapered teeth on the planet gear(s) and the mating ring and sun gears and biasing means for urging the mating gears axially into lash free engagement. The tapered teeth may be formed on constant pitch circles or on conical pitch circles of conical gears and the teeth of at least one of a pair of mating gears may be crowned to control loading and wear. The taper angles of the teeth and/or the conical pitch circles of the conical gears are preferably made small enough to avoid gear drive forces from developing gear separation forces greater than restraining friction forces.

11 Claims, 4 Drawing Sheets

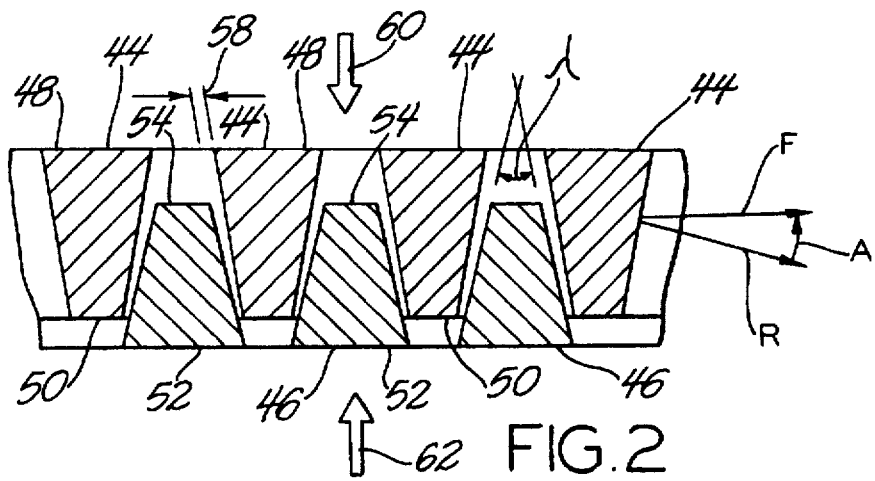
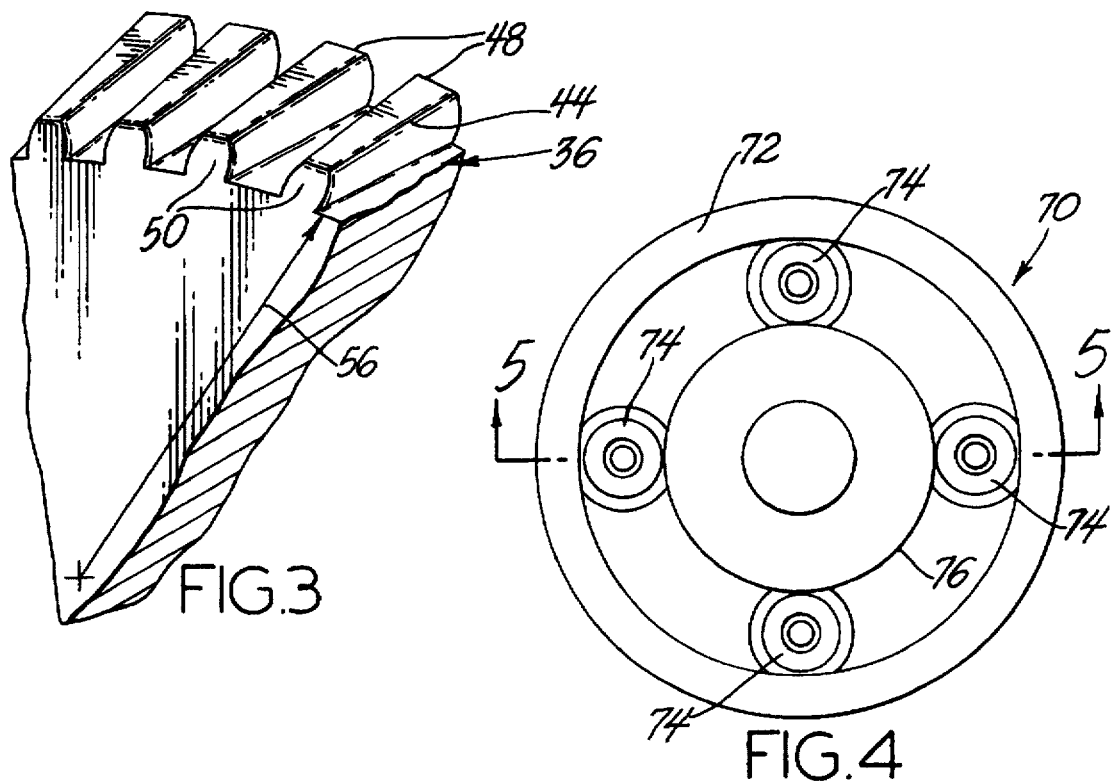
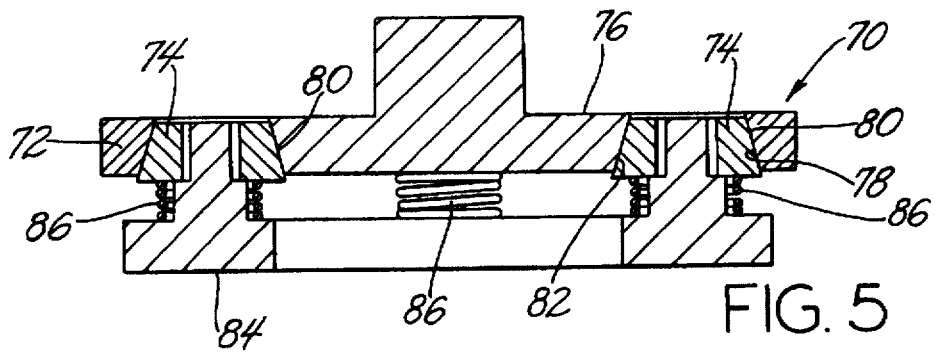

5,680,836

1

PLANETARY CAM PHASER WITH LASH COMPENSATION

TECHNICAL FIELD

This invention relates to cam phasers for engine timing drives and more particularly to planetary cam phasers having means for taking up lash in the planetary gear train.

BACKGROUND

U.S. Pat. No. 5,327,859, granted Jul. 12, 1994, to the assignee of the present invention, discloses an engine timing drive incorporating a planetary cam phaser for varying the phase angle between a driven camshaft and a driving crankshaft of the associated engine. A fixed phase drive train for an associated balance shaft is also included. The camshaft phase angle is varied by adjusting the angular position of a sun gear of the planetary gear train by means of a directly connected control shaft extending through a front cover of the associated engine. The planetary gear train disclosed appears to utilize spur gears rotatable on spaced centers and having no apparent means for taking up lash which may occur between the teeth of the planetary gears due to manufacturing tolerances or wear.

SUMMARY OF THE INVENTION

The present invention provides lash take-up means in a planetary cam phaser for controlling the timing of an associated engine camshaft. The planetary gear train may include a sun gear which is angularly positioned to vary the phasing of the camshaft. The lash take-up means for the planetary gear train include teeth of a planet gear or gears tapering in an axial direction to a smaller dimension at one end and mating with generally oppositely tapered teeth of planetary ring and sun gears, and biasing means, such as springs, urging the gears into lash free engagement. Optionally the biasing means may act upon the planet gears or the ring and sun gears. Alternatively, the planet gears may be split with spaced sections having oppositely tapered teeth, the sections being urged together by biasing springs or other means.

In varying embodiments, the tapered teeth may be formed on constant pitch circles or on conical pitch circles and the mating teeth of at least one of each pair of mating gears may be crowned. Preferably, the taper angle of the teeth, or of the conical pitch circle of conical gears, is made sufficiently small that friction forces generated by engagement and loading of the teeth remain at least as great as gear separation forces generated by the tooth taper angles so that the planetary gear drive forces do not create gear tooth separation and lash.

These and other features and advantages of the invention will be more fully understood from the following description of certain specific embodiments of the invention taken together with the accompanying drawings.

BRIEF DRAWING DESCRIPTION

In the drawings:

FIG. 2 is a cross-sectional view taken in the curved plane 2—2 of FIG. 1 and illustrating the tapering of mating teeth formed on constant pitch circles;

FIG. 3 is an isometric view illustrating the configuration of the tapered teeth of one of the planet gears;

2

Figure 6:
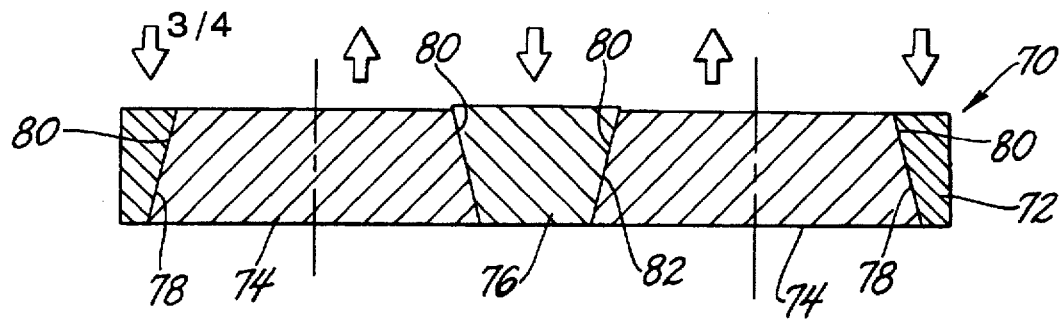
Figure 7:
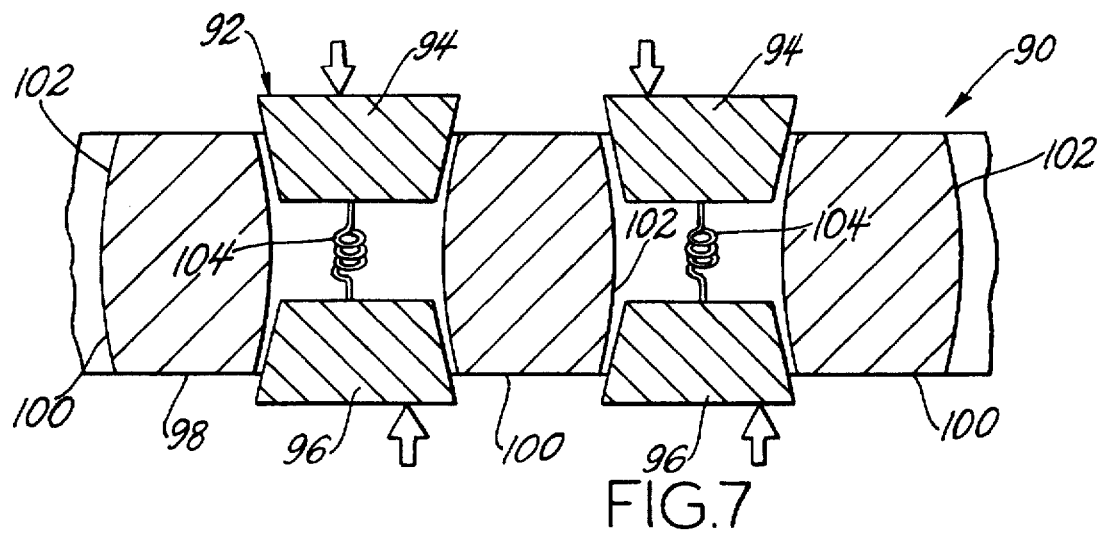
Figure 8:
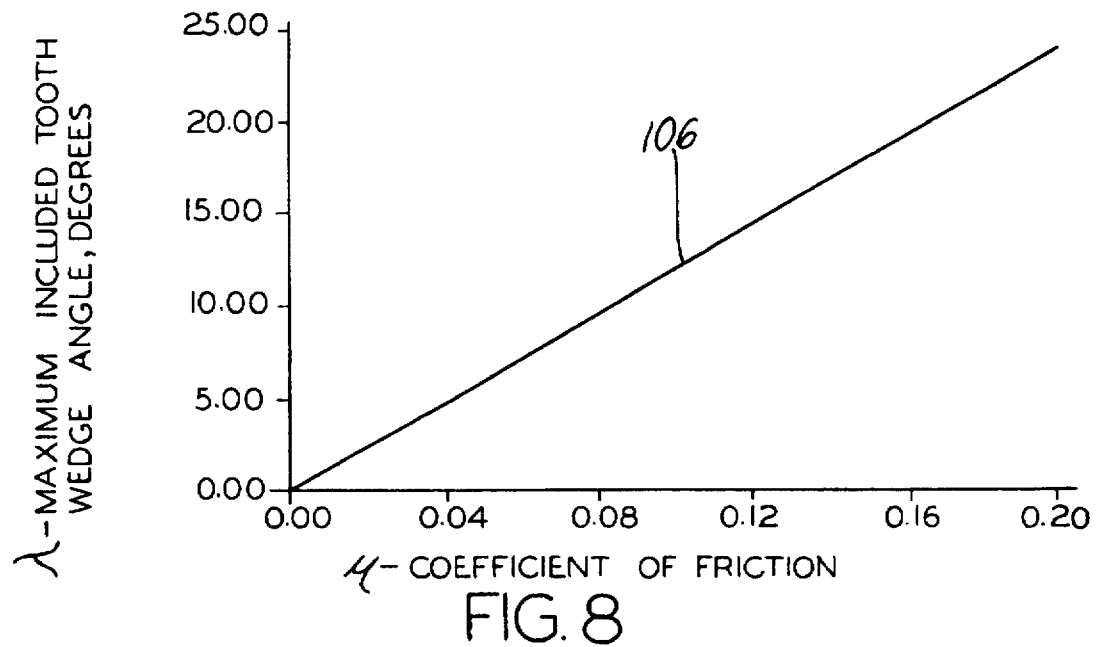
Figure 9:
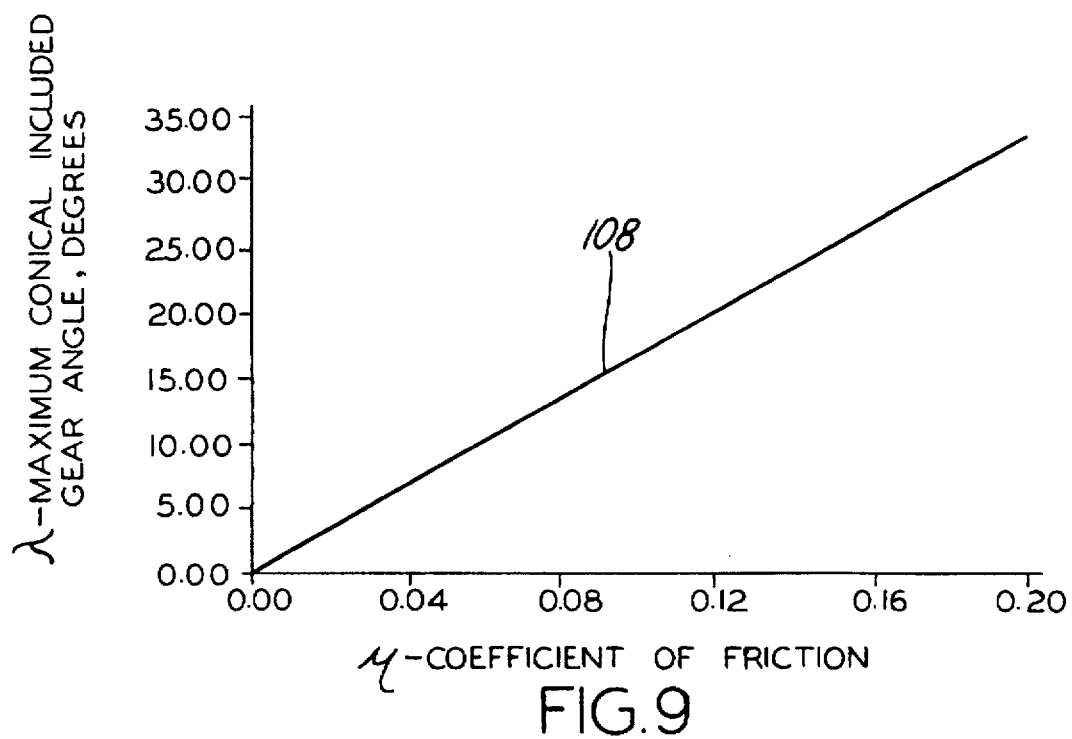
Figure 10:
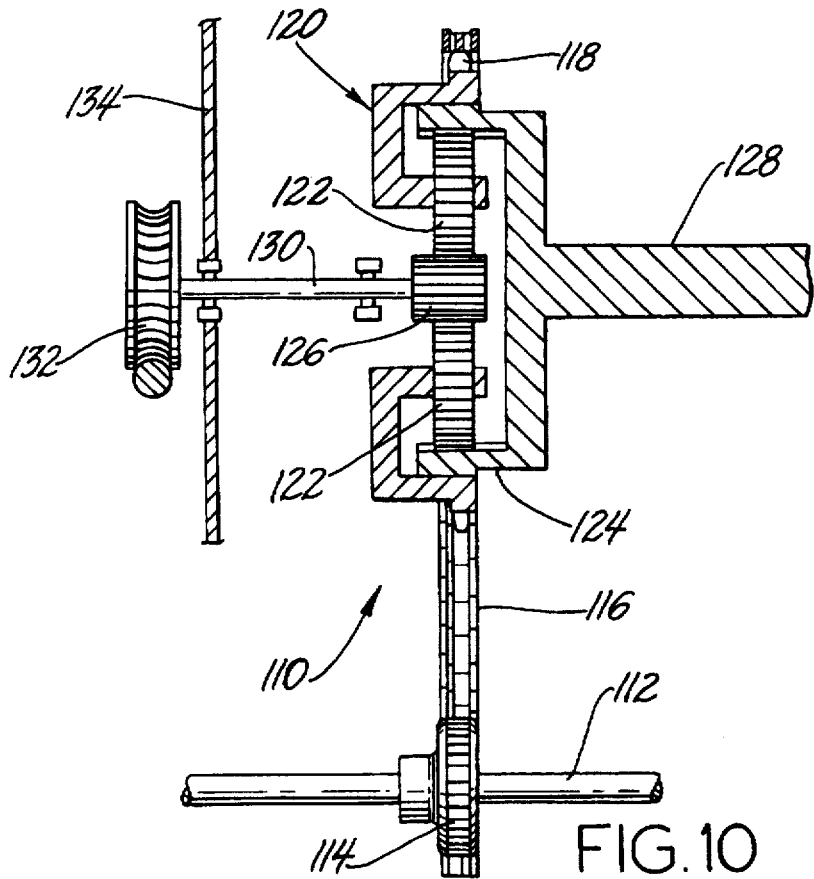

FIG. 4 is a schematic front view illustrating the planetary gear train of an alternative embodiment of planetary cam phaser having gears with conical pitch circles;

FIG. 5 is a schematic cross-sectional view from the line 5—5 of FIG. 4 illustrating engagement of the conical pitch circles of the mating gears and biasing springs applied to the planet gears;

FIG. 6 is a schematic view based upon FIG. 5 and illustrating lash compensation forces applied to the gears by means of the planet biasing springs;

FIG. 7 is a schematic view similar to FIG. 6 but showing an alternate embodiment of planetary cam phaser having oppositely angled conical planet gear halves including split half-gear elements engaging preferably crowned teeth of the mating ring and sun gears;

FIG. 8 is a graph illustrating the relation of the maximum included tooth wedge angle for lash avoidance to the friction coefficient at a selected gear pressure angle;

FIG. 9 is a graph illustrating the relation of the maximum conical gear included angle for lash avoidance to the friction coefficient at a selected gear pressure angle; and FIG. 10 is a schematic view showing an exemplary alternative form of planetary gear train arrangement in a cam phaser according to the invention.

DETAILED DESCRIPTION

Figure 1:
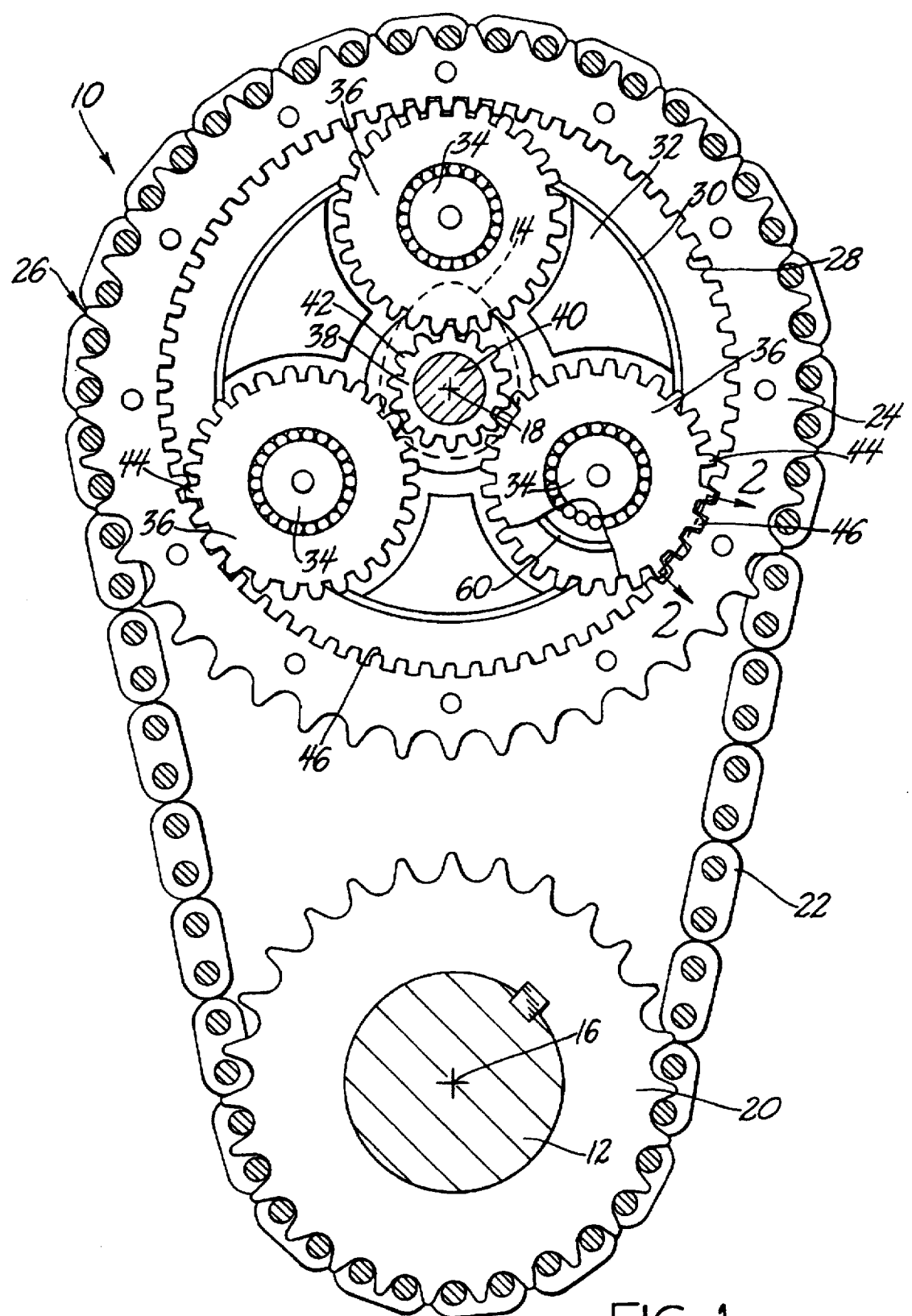
FIG. 1 is a front view of a portion of a planetary cam phaser showing a first embodiment of planetary gear assembly.

Referring now to the drawings in detail, FIG. 1 illustrates a four-stroke cycle internal combustion engine 10 usable, for example, in an automobile. Engine 10 includes a cylinder block, not shown, rotatably supporting a crankshaft 12 and a camshaft 14 mounted on parallel axes 16, 18, respectively, that are upwardly aligned along a central vertical plane of the engine.

At the front end shown of the engine, the crankshaft 12 carries a drive sprocket 20 that is connected by a chain 22 to a driven sprocket 24. Optionally, other means, such as gears or a timing belt drive, could be used in place of the chain drive shown. The driven sprocket 24 forms part of a planetary cam phaser or phase changer 26 that is mounted on the camshaft 14 as will subsequently be more fully described.

A ring gear 28 is fixed inside of or forms a part of the driven sprocket 24 for rotation therewith. The ring gear 28 and the driven sprocket 24 are rotatably supported by bearings 30 on a planet carrier 32. The carrier includes a drive flange, not shown, that is secured to the camshaft 14. The carrier also includes any number of, in this case three, stub shafts 34, each of which supports a planet gear 36 for rotation thereon. The planet gears 36 engage the ring gear 28 and the central sun gear 38. An annular cover, not shown, mounted on the stub shafts 34, closes an open end of the planet carrier 32 and helps support the driven sprocket thereon.

A stationary chain or belt cover or front cover, not shown, may be provided to enclose portions of the planetary cam phaser as so far described. An actuator shaft 40 engages the sun gear to provide a driving connection between the sun gear and an actuator, not shown, which may be mounted upon the front cover. The actuator may be of any desired type, although a worm gear actuator driven by an electric control motor is presently preferred.

In this embodiment of the invention, the planetary sun, planet, and spur gears are generally of the spur gear type, having axial oriented teeth formed on constant pitch circles. The sun gear has teeth 42, the planet gears have teeth 44, and the ring gear has teeth 46. In accordance with the invention, the teeth 42, 44, 46 are modified from the usual straight sided spur gear teeth in a manner that is best shown in FIGS. 2 and 3. FIG. 2 shows a schematic cross-sectional view of the teeth 44, 46 of the planet and ring gears as viewed from the curved plane 2—2 of FIG. 1 along their respective pitch circles. As the figure indicates, the sides of the teeth are tapered so that the teeth 44 of the planet gears are wider at their rear facing ends 48 and taper to a narrower width dimension at their forward facing ends 50. The mating teeth 46 of the ring gear are oppositely tapered so that the forward ends 52 are wider and the teeth 46 taper inwardly (toward one another) to rear ends 54 which are of narrower width dimension. The teeth 42 of the sun gear are tapered in the same manner as teeth 46 of the ring gear so that they mesh properly with the oppositely tapered teeth 44 of the planet gears. FIG. 3 illustrates isometrically one of the planet gears 36 having teeth 44 extending radially outward from a constant pitch circle 56 with their sides tapering inwardly (toward one another) from the wider rear ends 48 to narrower forward ends 50.

In FIG. 2, the teeth 44, 46 are shown slightly separated to illustrate a small amount of clearance or a lash 58 between the teeth. However, in accordance with the invention, biasing springs, such as coil springs 60 or other biasing elements, are located behind the planetary gears to urge them forward in an axial direction as shown by the arrow 60 in FIG. 2, which schematically represents the biasing springs 60 shown in a cutaway portion of FIG. 1.

These springs 60 force the planet gears 36 forward so that the angled sides of the teeth 44 actually engage the oppositely angled sides of the ring gear teeth 46 and the mating teeth 42 of the sun gear, thereby taking up any lash that might otherwise have been present in the system due to manufacturing tolerances or wear. Arrow 62 in FIG. 2 indicates the reaction force which is placed on the ring gear by the forward loading of the planet gears. This reaction force is taken by a thrust bearing, or other means, which maintains a constant axial position for the ring gear. If desired, it would be possible to provide alternative biasing means acting upon the ring gear and the sun gear separately and to have the reaction forces of the planet gears taken up by suitable bearings or the like which fix their axial rotating positions.

In operation of the embodiment just described, the crankshaft 12 of the engine 10 rotates during operation, driving the camshaft 14 through the planetary cam phaser 26. The ratios of the sprockets and gears of the planetary gear train are chosen so that, when the sun gear 38 is held stationary, the camshaft is driven at one half crankshaft speed in a fixed phase relation, as is conventional for a four-stroke cycle engine. If a two-stroke cycle engine were involved, the camshaft would normally be driven at the same speed as the crankshaft.

In order to change the phase relation of the camshaft with respect to the crankshaft while the engine is operating, the actuator shaft 40 is rotated by a suitable external actuator and control so as to change the rotational position of the sun gear 38 in the planetary gear train. This change causes relative rotation of the planet carrier 32 within the driven sprocket 20, thereby rotating the camshaft and changing its phase with respect to the driven sprocket and the directly connected crankshaft 12.

In operation of an engine, the camshaft 14 will be subject to significant variations and reversals of torque caused by actuation by the cams of associated engine valves and/or other equipment. If lash were present in the planetary gear train, these torque reversals would result in clatter or noise caused by alternate taking up of the lash in opposite directions so that the gear teeth would constantly move back and forth between engagement on one side of the gears and engagement on the other sides. To avoid this possibility, the present invention provides the lash compensation means described wherein the tapered teeth of the planet gears engage the oppositely tapered teeth of the ring and sun gears to take up all of the lash and avoid the problem of gear clatter.

Because of the angular engagement of the gear teeth, it will be apparent that rotational forces transmitted from one gear to another will have both a rotational component and an axial component. The axial component A, as shown in FIG. 2, must be kept sufficiently small to avoid its overcoming the friction between the teeth and the biasing force of the coil springs 60 and causing the gear teeth to be forced apart, as this would reintroduce lash between the teeth which the lash compensation means is intended to avoid. Thus, the included tooth wedge or taper angle $\lambda$ of the sides of the teeth must be kept sufficiently small so that such tooth separation will not occur in operation. This may be accomplished as will be subsequently more fully discussed.

Referring now to FIGS. 4–6 of the drawings, there is shown schematically an alternative embodiment of planetary cam phaser lash compensation arrangement including a planetary gear train generally indicated by number 70. Gear train 70 also includes a ring gear 72, planetary gears 74, in this case four in number, and a sun gear 76 which engage one another in conventional fashion. In these schematic figures, the teeth of the gears are not shown and, instead, the pitch circles along which the teeth of the gears engage one another are illustrated as the contact points.

It will be noted that the gears of this planetary gear train differ from those of the previous embodiment in that the pitch circles of the gears are conical. Thus the ring gear has a conical pitch circle 78 which coincides at the point of engagement with the pitch circles 80 of the planet gears and the sun gear 76 has a pitch circle 82 that coincides at its points of engagement with the pitch circles 80 of the planet gears.

It will be apparent that, as the pitch circles 78, 80, 82 of the interengaging gears are tapered by reason of their conical shape, that the teeth of the gears, which are not shown, are also tapered in the same manner, having their wider portions at the wider ends of their respective gears and the narrower portions of the tapered teeth at the narrow ends of their respective conical gears. Thus, in order to take up lash which may otherwise exist between the teeth, the planet carrier 84, as shown in FIG. 3, is provided with preload coil springs 86 which engage the planet gears 74 and urge them outwardly into engagement with the mating ring and sun gears 72, 76, respectively. Thus lash between the teeth is taken up in much the same fashion as with the previously described embodiment.

In the same manner, in order to avoid back driving forces caused by torsional loads acting between the ring gear and the planet gears and the planet gears and the sun gear from causing axial forces great enough to cause separation of the gears, it is necessary to limit the taper or the cone angle of the gear pitch circles to a figure that limits the axial side thrust side forces on the gears to no greater than the frictional forces between the gears which prevent the gears from being forced axially by the side thrust forces. This is accomplished in a manner to be subsequently described.

FIG. 7, is similar to FIG. 2 but illustrates a third embodiment of planetary cam phaser generally indicated by numeral 90. In this cam phaser, the planet gears 92 are split into spaced halves having oppositely tapered teeth 94, 96 with their narrower ends facing inwardly as shown. These tapered teeth 94, 96 engage the teeth 98 of the ring gear 100 which may have mating tapered faces but, preferably, have faces 102 which are crowned as shown to engage the teeth 94, 96 of the planet gears along predetermined central points of their pitch circles. In order to take up lash (shown by clearances in the drawing), the two halves of the planet gear 92 are drawn together by tension springs 104 or other tension devices so that the forces between the two halves of the planet gears close up the clearances between them and their associated ring and sun gears (each having crowned teeth). Thus, all of the thrust forces on the planetary gear train from the lash compensation means are limited to the gear tooth surfaces and have no component which causes an axial thrust force upon the ring and sun gears as in the previously described embodiments.

The following relates to the determination of tooth and cone angles to assure that gear torque loading from camshaft back drive forces will not cause a resulting separation force on the tapered gear teeth that will overcome or interfere with the lash compensation means of this invention. In the case of variable thickness tapered teeth formed with constant pitch diameters, the maximum included tooth angles for self locking (where back drive forces have no effect on the lash compensation forces) defined as a function of gear friction coefficient and pressure angle are shown in FIG. 8. These values are defined by the equation:

$$\lambda \leq 2 \times \tan^{-1}(\mu/\cos \phi)$$

where:

$\lambda$=included tooth wedge angle $\mu$—friction coefficient $\phi$=normal pressure angle on tooth This equation defines the wedge angle at the self locking condition indicated by the line 106 in FIG. 8. For typical values (friction coefficient=0.1, and the normal pressure angle=20 degrees) the maximum self locking wedge angle is about 12.1 degrees. A practical wedge angle range may be 3 to 15 degrees and depends on the amount of lash or wear for which the designer wishes to compensate and on the other aspects listed in the equation above.

For conical gears, the maximum included cone angles for self locking are shown in FIG. 9 and are defined by the equation:

$$\lambda \leq 2 \times \tan^{-1}(\mu/(2 \times \sin \phi))$$

where:

$\lambda$=included gear conical angle $\mu$=friction coefficient $\phi$=normal pressure angle on tooth This equation defines the conical gear angle at the self locking condition indicated by the line 108 in FIG. 9. For typical values (friction coefficient=0.1, and the normal pressure angle=20 degrees) the maximum conical angle is about 16.6 degrees. This angle is probably larger than would be actually used in a productive planetary phaser design. But the actual range that could be used by a designer may be between 3 to 20 degrees.

It should also be noted with the conical gear concept that the gears mesh at different radii unless the gear teeth are cut with a crown. FIG. 5 helps demonstrate this situation; the bottom side of the planet gears have a larger radius than the top side. The larger radius of the planet gear meshes with the smaller radius of the ring and sun gears. In effect, the gear ratio at this location is different than the gear ratio on the upper surface of these gears. One way to prevent the resultant problems of these differing gear ratios is to shape the gear teeth with a crown (which means the gear tooth thickness is greater at the mid length position and narrower at the ends) so that there is only one point of contact between the gears. The crown can be small so that as load is increased between the gears, the contact patch increases rapidly and contact stress is limited. Another way to minimize this effect is to reduce the conical angle to the lower end of the "practical range".

Note that friction coefficient seldom has a static value, i.e., its value depends on material surface finishes, material choices, velocity, vibration levels, etc. The variable friction coefficient does not affect the validity of the equations.

In order to avoid gear tooth separation from back drive forces, it is necessary that the design tooth or cone angles of the gears not exceed the maximum values indicated for the various friction coefficient and gear pressure angle conditions. However, the farther the tooth or cone angles lie below the maximum conditions of lines 106 and 108 in FIGS. 8 and 9, for example, the greater will be the friction forces which are generated in the gear train by back drive forces acting thereon. Accordingly, it may be desirable to select the tooth or cone angles to be as close to the maximum condition as possible.

It should be apparent that the friction and side thrust conditions affecting planetary gear trains as described above are applicable to planetary gear train embodiments other than those illustrated in the previous examples wherein the camshaft phase angle is adjusted by rotating the sun gear. Other embodiments may be chosen wherein any of the planet carrier and the sun and ring gears is used to vary the phasing and the other two gears are used as input and output gears in either direction of drive.

One such planetary embodiment which could be adapted for use as a camshaft drive is shown schematically in FIG. 8 as installed in an engine 110. A crankshaft 112 has a driving sprocket 114 connected through timing chain 116 with a driven sprocket 118 forming part of a planet carrier 120. Carrier 120 supports planet gears 122 which engage a ring gear 124 and a sun gear 126 coaxial with the planet carrier. The ring gear 124 is connected with the engine camshaft 128 for driving the camshaft in proper phase with the crankshaft. The sun gear is connected by shaft 130 with a worm gear actuator 132 mounted on an outer cover 134 for rotatably varying the position of the sun gear 126 to vary the phase relation of the camshaft 128 relative to the crankshaft 112.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A planetary cam phaser for controlling the timing of a camshaft driven on a camshaft axis from a crankshaft of an associated engine, said phaser including a planetary gear train having rotatable coaxial members including a ring gear, a planet carrier and a sun gear, the planet carrier supporting at least one rotatable planet gear engaging the ring and sun gears, a first one of said coaxial members comprising a driven member connectable with the crankshaft, a second one of said coaxial members comprising a drive member connectable with the camshaft, the angular position of a third one of said coaxial members being adjustable to vary the phasing of the camshaft relative to the crankshaft, said phaser characterized by:

lash take-up means for said gear train, wherein said planet gear includes teeth tapering in an axial direction to a smaller dimension at one end and mating with generally oppositely tapered teeth of said ring and sun gears, and biasing means urging relative axial motion of said planet gear and the ring and sun gears toward lash free engagement of their mating teeth, said relative axial motion of said gears being in the directions from the larger to the smaller dimensioned ends of their teeth.

2. A planetary cam phaser for controlling the timing of a camshaft driven on a camshaft axis from a crankshaft of an associated engine, said phaser including a planetary gear train having a ring gear, a planet carrier and a sun gear rotatable on a common axis, the planet carrier supporting at least one rotatable planet gear engaging the ring and sun gears, one of said ring gear and said planet carrier comprising a driven member connectable with the crankshaft and the other of said ring gear and said planet carrier comprising a drive member connectable with the camshaft, the angular position of the sun gear being adjustable to vary the phasing of the camshaft relative to the crankshaft, said phaser characterized by:

lash take-up means for said gear train, wherein said planet gear includes teeth tapering in an axial direction to a smaller dimension at one end and mating with generally oppositely tapered teeth of said ring and sun gears, and biasing means urging relative axial motion of said planet gear and the ring and sun gears toward lash free engagement of their mating teeth, said relative axial motion of said gears being in the directions from the larger to the smaller dimensioned ends of their teeth.

3. The invention as in claim 2 wherein said planet gear is urged axially toward engagement with said ring and sun gears.

4. The invention as in claim 2 wherein said ring and sun gears are urged axially toward engagement with said planet gear.

5. The invention as in claim 2 wherein each said planet gear includes two axially spaced elements having opposite tooth taper with their smaller ends facing one another and said mating teeth of the ring and sun gears have outwardly tapering teeth becoming smaller toward their outer edges, said biasing means urging said planet gear elements axially toward one another.

6. The invention as in claim 5 wherein said ring and sun gears have crowned teeth.

7. The invention as in claim 2 wherein said teeth are tapered in width on a constant pitch circle.

8. The invention as in claim 2 wherein said teeth are formed on a conical pitch circle and tapered in a generally cone shaped manner.

9. The invention as in claim 2 wherein the teeth of at least one gear of each mating pair are crowned as well as tapered.

10. The invention as in claim 2 wherein said teeth have a taper angle sufficiently small that the friction forces generated by tooth engagement remain greater than gear separation forces generated by the tooth taper angles so that planetary gear drive forces do not create gear tooth separation and lash.

11. The invention as in claim 1 wherein said teeth have a taper angle sufficiently small that the friction forces generated by tooth engagement remain greater than gear separation forces generated by the tooth taper angles so that planetary gear drive forces do not create gear tooth separation and lash.

* * * * *